Aug. 19, 1952      D. J. DOAN      2,607,311

SOLDER BAR

Filed Feb. 19, 1948

INVENTOR.

Donald J. Doan

BY

Wood, Arey, Herron & Evans

ATTORNEYS

Patented Aug. 19, 1952

2,607,311

UNITED STATES PATENT OFFICE 2,607,311

SOLDER BAR

Donald J. Doan, Hammond, Ind., assignor to The Eagle-Picher Company, Cincinnati, Ohio, a corporation of Ohio Application February 19, 1948, Serial No. 9,390

2 Claims. (Cl. 113—110)

This invention relates to solder bars and is particularly directed to a form of solder bar of the type used for filler metal in the repair of damaged sheet metal structures such as automobile bodies and the like.

Wrecked automobile bodies are usually repaired by pounding the damaged areas into alignment with the general body contour and then filling in the remaining cavities or cracks with enough solder to restore the body lines. The job is completed by smoothing over the filler metal with a hand grinder and then repainting the repaired surfaces. The solder or filler metal is applied in molten form from the end of a long bar, which the mechanic holds in one hand and directs to the desired point of application, meanwhile holding a torch or hot iron in his other hand to supply the difficult heat. As the end of the bar is melted off, it grows shorter and shorter, and the repairman eventually finds it necessary to discard the stub because his fingers are exposed to the heat of the soldering torch or iron. Consequently, the stub ends are discarded and must be remelted and recast before the metal they contain can be applied.

In order to save these stub ends, it has been proposed to provide solder bars having male plugs formed on one end and female sockets on the other, enabling the user to connect two bars together and use one bar as a handle while the other is fed progressively into the work until it is completely used up. Unfortunately, the plug-socket coupling arrangements of the past have proved undesirable in several respects. The plugs often fit imperfectly within the sockets, being either too small and thereby creating a wobbling effect at the joint, or too large, making it difficult to form a positive connection. Moreover, plug-socket coupling means do not provide sufficient rigidity for the feeder bar, and bars joined in this manner tend to sag longitudinally relative to each other often becoming disconnected during use. Under these conditions, it is difficult for the repairman to direct the end of the feeder bar to the damaged area while attempting to hold and feed the bars with one hand. A further common disadvantage of the plug and socket type of connection occurs by reason of air which becomes entrapped when the plug and socket are mated together. During use, the entrapped air becomes heated and expands, especially when the short end of the bar is about used up. Sometimes, when the solder finally liquifies, the pressure is suddenly released and molten metal is blown away by the compressed air. In other instances, the pressure is merely sufficient to dislodge the short projecting end of solder bar from its connection, and when this occurs, the short end cannot conveniently be resocketed since it is too hot to handle.

Standard bars of this type are usually cast in one pound sizes to facilitate marketing and handling. While a one pound bar satisfies normal industrial requirements, in many instances it is desirable to use a smaller bar of fractional pound sizes when small dents and cavities are to be filled, or when the more intense heat required to melt a larger bar is either unnecessary or undesirable. It is the object of this invention to provide an easily fabricated solder bar containing interlocking means by which it may be quickly and easily joined to a similar bar through the medium of a self-sustaining double wedge action joint which extends along a substantial portion of both bars, rigidifying each bar against longitudinal sag in respect to the other.

A further objective is to provide a bar which may be easily divided longitudinally into bars smaller in cross section, each of which has less weight and mass so as to be more usable in places of confinement or when intense heat is undesired.

In general, the bar of this invention consists of two elongated sections joined by a thin central webbing so formed that a similar bar rotated on its axis through an angle of 90° in respect to the first may be pressed onto one end of the first bar and locked in place frictionally through contacting of the section faces. Other advantages and objects of this invention will become apparent from the detailed description and the drawings in which.

Figure 1:
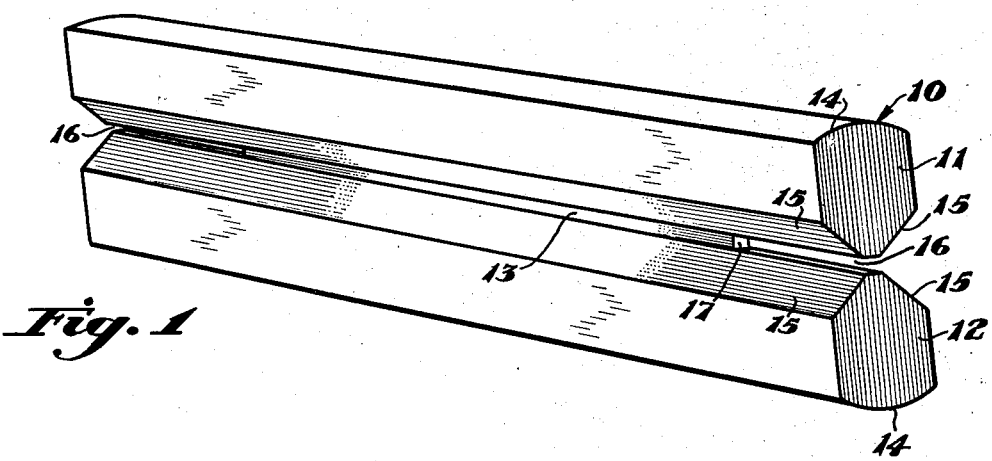
Figure 1 is a side view in perspective of a preferred embodiment of the invention.

A preferred embodiment of the present invention is shown in Figure 1 indicated generally by the number 10. The bar, of course, may be fabricated from any suitable soldering material or alloy and may be quickly and inexpensively manufactured by either extrusion molding or casting methods well known in the industry.

The bar 10 comprises two parallel elongated sections, or body portions 11 and 12 joined by a thin rupturable integral webbing 13 extending between the central areas of each section. It will be noted that each section comprises a separate smaller solder bar which approximates one-half of the weight of the whole bar. Since the webbing is comparatively thin, it can be cut quite easily with a saw, or the sections may be parted with a light chisel. Thus, if it is desired to lighten the bar, or save space in a repair kit by carrying a one-half pound bar instead of a full pound bar, or if it is necessary to use only a small amount of solder to fill a small cavity, the repairman can, by removing the web section, split the main bar into two smaller ones suitable for these purposes.

In the embodiment shown, the sections 11 and 12 are generally rectangular in cross section but have rounded backs 14 to present more comfortable holding surfaces for the user. The sections are chamfered on a 45° angle at the inward corners of the rectangle to present longitudinally extending, symmetrically arranged contact faces 15 which are adapted frictionally to engage like faces on another similar bar. Hence, the inner portion of each section is formed to a right angled frusto-conical profile and the faces formed longitudinally on each section cooperate to define parallel grooves, the sides of which form a 90° angle, extending along opposite sides of the bar.

At the respective ends of each webbing slots 16 are formed between the sections, the grooves being wide enough to receive the webs of mating bars. In the event that the bar is extruded, these slots may be formed by cutting or sawing away the end portions of the webbing or, if the bar is manufactured by a molding process, the slots may be cast directly into the bar. The slots also may be tapered slightly as, for example, in the amount of one to five thousandths of an inch per inch of length, in order to provide a wedging connection between mating units which is firm and reliable even under the most adverse conditions of usage.

Figure 2:
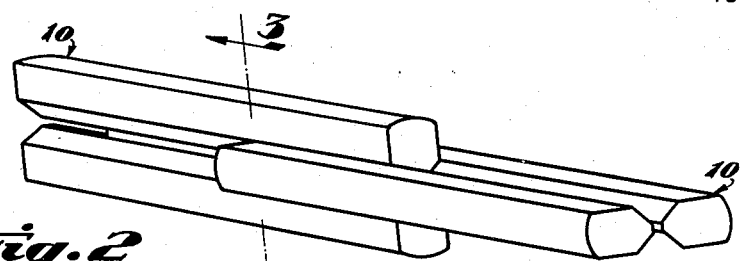
Figure 2 is also a side view in perspective showing a handle bar and the stub of the feeder bar in interlocking engagement according to the manner of this invention.
Figure 3:
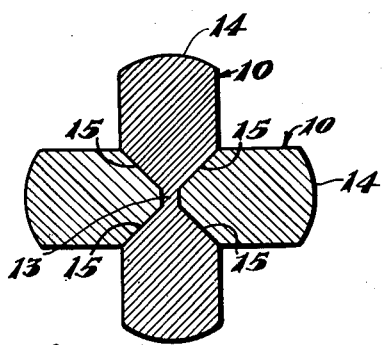
Figure 3 is a vertical section taken along line 3—3 of Figure 2.

The manner of joining two bars together is best shown in Figures 2 and 3. The user simply selects two bars and by rotating one bar on its own axis 90° with respect to the other, fits their respective ends together so that they are in longitudinal alignment. The bars are then pressed together, the sections sliding together, the web of one passing into the slot 16 of the other until movement is terminated by the abutment of the ends 17 of the webbing and slot. The joint thus formed embodies a double wedge action in which each groove frictionally receives one of the body portions of the mating bar, and each section of each bar is held snugly between the contact faces of the abutting sections of the mating bar. It is noteworthy that even though mismated or loosely fitted bars are selected, the connection will be maintained, despite the absence of frictional engagement of the contacting faces since each bar is so mechanically interlocked with the mating bar that they can be disengaged only by moving one longitudinally in respect to the other for a substantial distance.

Although the bar of this invention is preferably cast in one pound weight sizes and each section weighs approximately one-half pound, it will be appreciated that larger or smaller sized bars may be used if desired.

Having described my invention, I claim:

1. A solder bar comprising two parallel elongate body portions and a thin rupturable webbing, said webbing connecting the central areas of said body portions, each of said body portions having inwardly chamfered contact faces terminating at said webbing, the faces formed on said body portions cooperating to define two parallel grooves, said grooves being disposed on opposite sides of said webbing, said webbing being removed at the endwise portions of said bar to permit longitudinal interlocking endwise engagement of said bar with a mating bar.

2. A solder bar comprising two parallel elongate body portions and a thin rupturable webbing, said webbing connecting the central areas of said body portions, each of said body portions having inwardly chamfered contact faces terminating at said webbing, whereby each body portion is of a substantially right angled frusto conical profile, the faces formed on said body portions cooperating to define two parallel grooves, said grooves being disposed on opposite sides of said webbing, said webbing being removed at the endwise portions of said bar to permit interlocking endwise engagement of said bar with a mating bar, wherein each of said grooves frictionally receives one of said body portions of the mating bar.

DONALD J. DOAN.

REFERENCES CITED

The following references are of record in the file of this patent:

UNITED STATES PATENTS

| Number | Name | Date |
| --- | --- | --- |
| 137,378 | McMullen | Apr. 1, 1873 |
| 1,112,773 | Craven | Oct. 6, 1914 |
| 1,189,241 | Craven | July 4, 1916 |
| 1,371,619 | Greenstreet | Mar. 15, 1921 |
| 1,650,394 | Shores | Nov. 22, 1927 |
| 1,750,671 | Koch | Mar. 18, 1930 |
| 2,157,097 | Jung | May 9, 1939 |
| 2,190,267 | Light | Feb. 13, 1940 |

FOREIGN PATENTS

| Number | Country | Date |
| --- | --- | --- |
| 19,797 | Great Britain | Sept. 10, 1902 |